United States Patent

Tabata et al.

Patent Number: 5,726,670
Date of Patent: Mar. 10, 1998

[54] DISPLAY APPARATUS TO BE MOUNTED ON THE HEAD OR FACE OF AN INDIVIDUAL

[75] Inventors: Seiichiro Tabata; Takayoshi Togino; Yoichi Iba, all of Tokyo, Japan

[73] Assignee: Olympus Optical Co., Ltd., Tokyo, Japan

[21] Appl. No.: 539,629

[22] Filed: Oct. 5, 1995

Related U.S. Application Data

[63] Continuation of Ser. No. 93,678, Jul. 20, 1993, abandoned.

[30] Foreign Application Priority Data

Jul. 20, 1992 [JP] Japan ................................ 4-191860

[51] Int. Cl.$^6$ ...................................................... G09G 5/00
[52] U.S. Cl. ......................................... 345/7; 345/8
[58] Field of Search ........................ 345/7, 8, 9; 359/618, 359/629, 630, 662; 353/13, 14

[56] References Cited

U.S. PATENT DOCUMENTS

| | | |
|---|---|---|
| 4,082,432 | 4/1978 | Kirschner . |
| 4,847,603 | 7/1989 | Blanchard ............................. 345/7 |
| 4,934,771 | 6/1990 | Rogers ................................. 359/610 |
| 5,189,452 | 2/1993 | Hodson et al. ....................... 359/630 |
| 5,189,512 | 2/1993 | Cameron et al. ..................... 345/8 |
| 5,302,964 | 4/1994 | Levins ................................. 345/14 |
| 5,320,534 | 6/1994 | Thomas ............................... 345/8 |

FOREIGN PATENT DOCUMENTS

| | | |
|---|---|---|
| 3241310 | 10/1991 | Japan . |
| 1596429 | 6/1980 | United Kingdom . |

*Primary Examiner*—Chanh Nguyen
*Attorney, Agent, or Firm*—Cushman, Darby & Cushman IP Group of Pillsbury Madison & Sutro LLP

[57] ABSTRACT

A display apparatus of the type that is fitted to the user's head or face, and having a higher resolution in a first region of the display than that of the remaining area of the display, without increasing the size of the display. As an example, an image of the characters "ABC", for example, are generated or received. However, it might be desired that the center character "B", for example, be displayed at a higher resolution than that of the characters "A C". To accomplish this, the original image "ABC" is divided into an image of "A C" and an image of "B". Then, the image of "B" is electrically distorted and formed on a screen such that the image of "B" is larger in size than the image of "A C". An ocular optical system including an optical element effects a second distortion of the image to correct the electrically created distortion. This ocular optical system enlarges the image such that the image of "A C", which has been displayed relatively small, is enlarged, and projects the image of "B", which has been displayed relatively large, through a lens having a correspondingly lower magnification. Then, the image of "B" is superimposed on the image of "A C" so that the image of "A C" and "B" are displayed at the same size, but with "B" being represented by more pixels or pixels which are finer than those representing "A C".

14 Claims, 10 Drawing Sheets

(a)

(b)

DISPLAY APPARATUS TO BE MOUNTED ON THE HEAD OR FACE OF AN INDIVIDUAL

This is a continuation of application Ser. No. 8/093,678, filed on Jul. 20, 1993 which was abandoned upon the filing hereof.

BACKGROUND OF THE INVENTION

The present invention relates to a display apparatus designed to be mounted on the user's head or face. More particularly, the present invention relates to a display apparatus of the type in which an image formed on a display screen is projected directly on the retinas in the user's eyes without using a screen or the like.

Hitherto, display apparatuses of the type in which an image is projected on a screen for observation have been well known. In this type of display apparatus, an image that is displayed on a CRT or a liquid crystal display is projected on a screen after being enlarged through a lens. Recently, this type of display apparatus has been also used as a head up display system for display of automotive meters. Further, a head-mounted display apparatus has been proposed in which a display of the type described above and an optical system associated therewith are mounted on the observer's head so as to enable the user to view a wide-screen image. In this case, the retinas in the user's eyes serve as a screen.

In this type of display apparatus, if the magnification of projection by the lens is increased in order to enlarge the image frame, the pixels are also enlarged correspondingly and become conspicuous. Accordingly, in order to form an image of high resolution, it is necessary to increase the size of the display itself and to use a lens of low magnification. For this reason, if it is intended to raise the resolution in a desired region of a displayed image, the overall size of the apparatus increases disadvantageously.

SUMMARY OF THE INVENTION

In view of the above-described circumstances, it is an object of the present invention to provide a display apparatus designed so that the resolution in a desired region of a displayed image is raised without an increase in the size of the display.

To attain the above-described object, the present invention provides a first display apparatus having an image display element for forming an image for observation on a screen, an ocular optical system for forming an optical path for leading a bundle of rays from the screen of the image display element to an observer's eyeball, and a support member for fitting the image display element and the ocular optical system to the observer's head or face. The ocular optical system and the screen of the image display element are respectively provided with distortions which are opposite in sign to each other so that the magnification of projection of at least one region of the image projected in the observer's eyeball by the ocular optical system differs from the magnification of projection of another region of the projected image.

In addition, the present invention provides a second display apparatus including an image producing device for generating or receiving an image, and an image processing device for giving a first distortion to the image sent from the image producing device. The second display apparatus further includes an image display element for forming on a screen the image given the first distortion by the image processing device, and an ocular optical system having an optical element for giving a second distortion for correcting the first distortion given to the image. The ocular optical system is arranged to form an optical path for leading the image to an observer's eyeball. The second display apparatus further includes a support member for fitting at least the image display element and the ocular optical system to the observer's head or face.

The second display apparatus is preferably arranged such that the first distortion is barrel distortion, and the second distortion is pincushion distortion.

In the first or second display apparatus, the ocular optical system is preferably formed so that the magnification of projection of a peripheral region of the image projected in the observer's eyeball by the ocular optical system is higher than the magnification of projection of a central region of the projected image.

In addition, the present invention provides a third display apparatus having a first image display element for forming a first image for observation on a screen, a first ocular optical system for forming a first optical path for leading a bundle of rays from the screen of the first image display element to an observer's eyeball, and a support member for fitting the first image display element and the first ocular optical system to the observer's head or face. The third display apparatus includes a second image display element for forming a second image for observation which is different from the first observation image formed on the screen of the first image display element, and a second ocular optical system having a magnification of projection different from that of the first ocular optical system. The second ocular optical system is arranged to form a second optical path overlapping the first optical path at at least a part thereof for leading a bundle of rays from the screen of the second image display element to the observer's eyeball.

In addition, the present invention provides a fourth display apparatus including an image producing device for generating or receiving an image, and a first image display element for forming on a screen only an original image of a certain region in the original image produced by the image producing device. The fourth display apparatus further includes a second image display element for forming on a screen an original image of the rest of the original image, exclusive of at least the original image of the certain region formed by the first image display element, and a first ocular optical system for forming a first optical path for leading the first image formed on the screen of the first image display element to an observer's eyeball. The fourth display apparatus further includes a second ocular optical system having a magnification of projection different from that of the first ocular optical system. The second ocular optical system is arranged to form a second optical path overlapping the first optical path at at least a part thereof so that the second image formed on the screen of the second image display element is led to the observer's eyeball and superimposed on the first image. In addition, the fourth display apparatus includes a support member for fitting at least the first image display element, the second image display element, the first ocular optical system, and the second ocular optical system to the observer's head or face.

The third or fourth display apparatus is preferably arranged such that the projection magnification of the second ocular optical system is higher than the projection magnification of the first ocular optical system.

In the present invention, an image is displayed on the image display element in such a manner that a desired region of the image is enlarged in comparison to the other region thereof. Then, the desired region is projected at a relatively low magnification, whereas the other region is projected at a relatively high magnification. Accordingly, although the projected image is an enlarged image similar to the original image, the pixels in the desired region are projected small in comparison to those in the other region. Thus, a region in the image where important information lies and which contains a relatively large amount of information can be displayed as an image of high resolution without increasing the size of the image display element, and a region which contains a relatively small amount of information can be displayed as an image of low resolution. The user's eyes that observe an image are usually centered at a region containing a relatively large amount of information. Accordingly, if the resolution of this region is raised, while the resolution of the other region is made relatively low, it is possible to make the user feel as if he or she were seeing an image of high resolution. According to the present invention, it is possible to display an image of high resolution for the user without increasing the size of the image display element. In addition, it is possible to facilitate the design and production of the optical system of the apparatus.

In the display apparatus that employs an optical system provided with distortion, it is preferable that local projection magnifications of the optical system produced by the distortion satisfy the following expression:

$$\beta_1/\beta_2 \geq 1.2$$

where $\beta_1$ and $\beta_2$ respectively represent the maximum and minimum values of local projection magnifications. By arranging the optical system so as to satisfy the above expression, the resolution in the desired region can be raised further.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The display apparatus of the present invention will be described below by way of preferred embodiments and with reference to the accompanying drawings.

Figure 1:
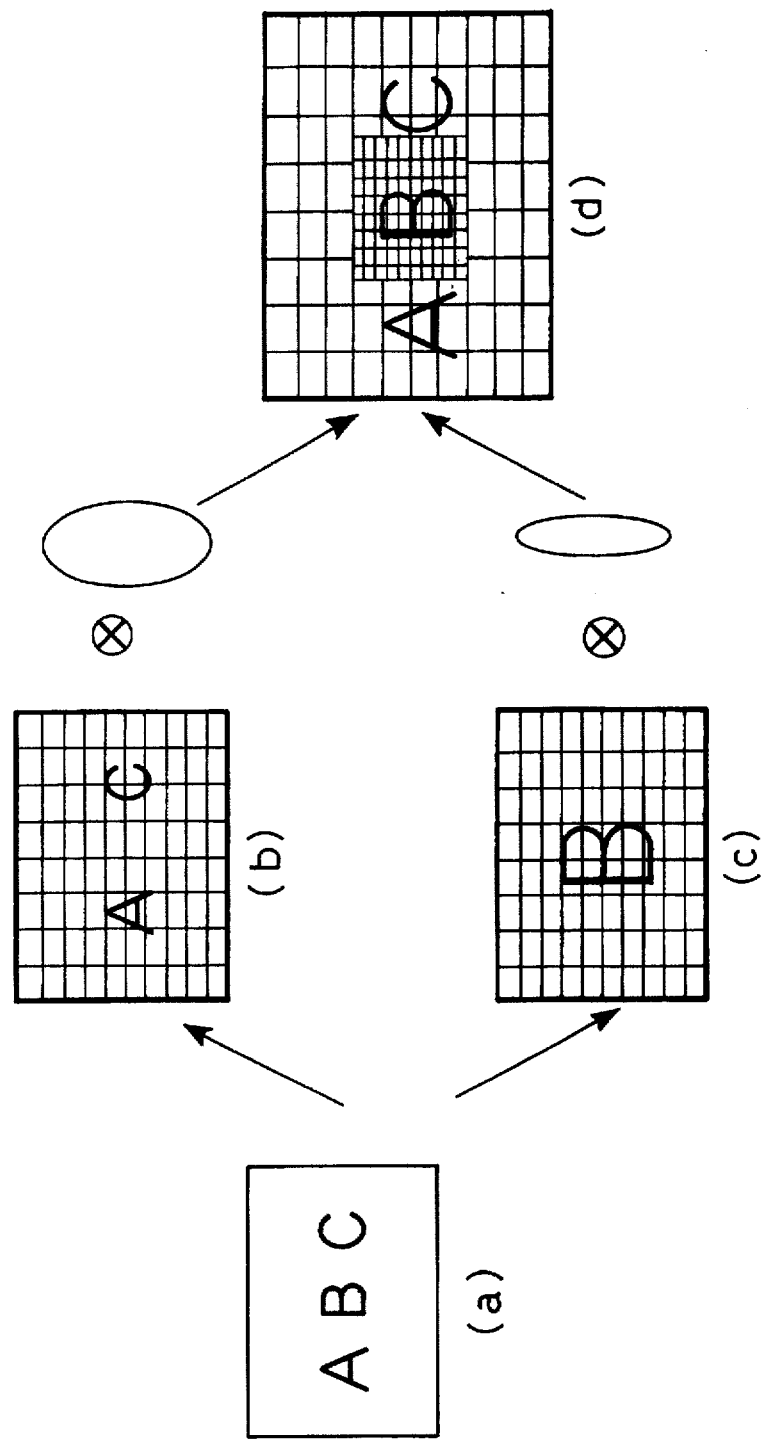
FIG. 1 shows the basic concept of an image display element employed in the present invention.

FIG. 1 shows the basic concept of an image display element employed in the present invention. Assuming that the characters "ABC" are to be displayed as an original image, as shown at (a) in FIG. 1, and that in the character string the character "B" is desired to be displayed at high resolution. In this case, first, the original image is divided into an image of "A C" and an image of "B", as shown at (b) and (c) in FIG. 1. Then, the two images are displayed in such a manner that the image of "B" (shown at (c) in FIG. 1) is larger in size than the image of "A C" (shown at (b) in FIG. 1). In these figures, the grid that is drawn by the thin lines indicates the size of the pixels. Next, each image is enlarged by using a lens. In this case, the magnification of the lens for the image of "A C" is higher than that of the lens for the image of "B". The magnification ratio is the reciprocal of the ratio of the size of the image shown at (b) in FIG. 1 to the size of the image shown at (c) in FIG. 1. More specifically, the image of "A C", which has been displayed relatively small, is enlarged, whereas the image of "B", which has been displayed relatively large, is projected through a lens having a correspondingly lower magnification. Then, these two images are superimposed on one another. As a result, an image such as that shown at (d) in FIG. 1 is obtained. It will be understood that although "A C" and "B" are displayed in the same size, "B" is represented by pixels which are finer than those for "A C". In other words, the resolution of "B" is relatively high, whereas the resolution of "A C" is relatively low. Thus, the present invention is based on the principle that a region which is desired to be displayed at high resolution is displayed relatively large on the display unit and then enlarged at a correspondingly lower magnification.

In the present invention, the original image "ABC" also needs to be formed on the basis of the above-described principle. That is, a region that is desired to be displayed at high resolution is imaged by using an objective lens of relatively high magnification, whereas the other region is imaged at a relatively low magnification. Alternatively, the process may be such that after "ABC" has been imaged with a single camera and subjected to image processing, "B" is taken out and electrically enlarged. When an image is to be artificially formed as in computer graphics, images enlarged at different magnifications, as shown at (b) and (c) in FIG. 1, may be produced.

Figures 2A, 2B:
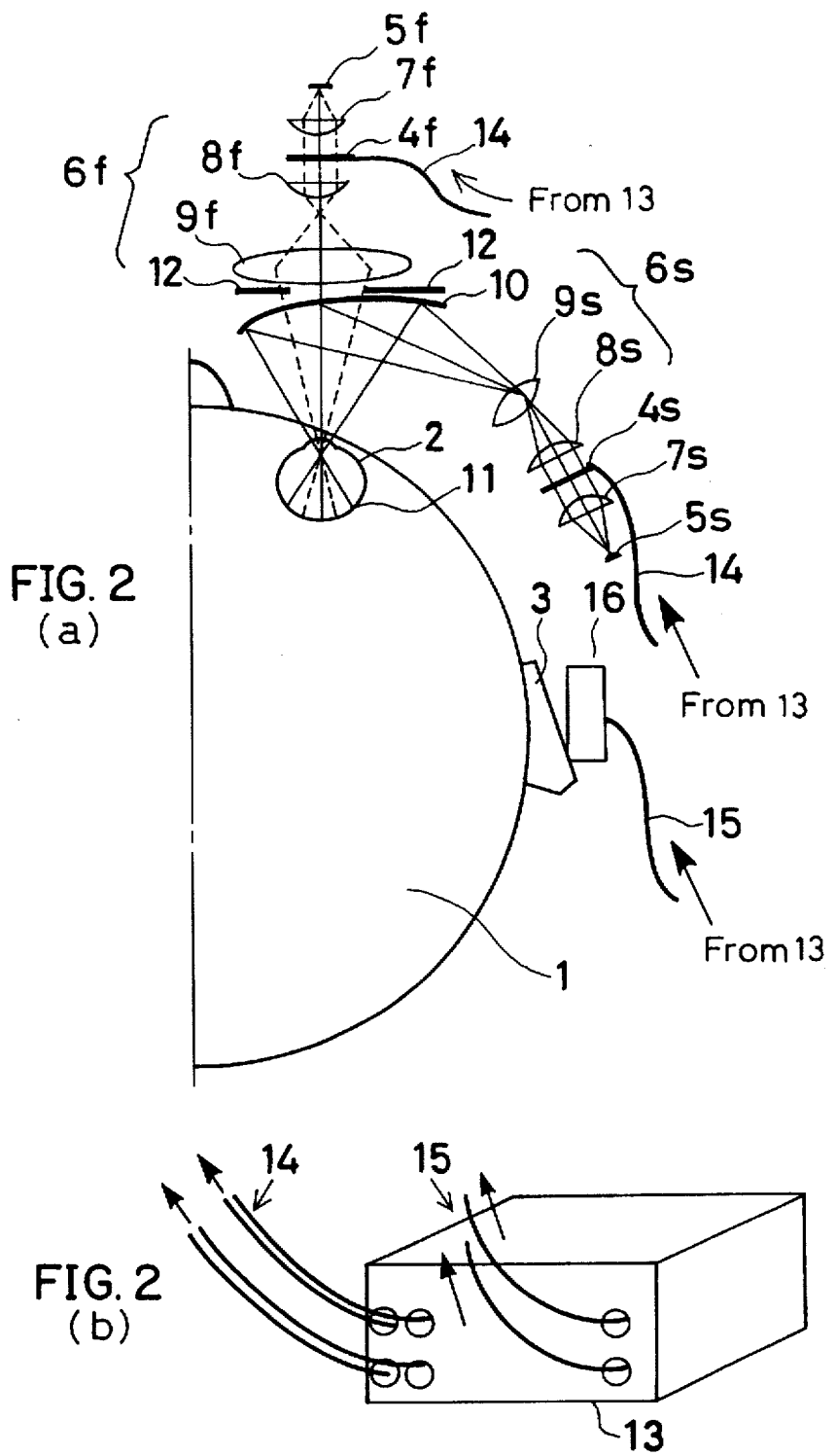
FIGS. 2(a) and 2(b) show the arrangement of a first embodiment in which the present invention is applied to a head-mounted display.

FIGS. 2(a) and (b) show the arrangement of a first embodiment in which the above-described principle of the present invention is applied to a head-mounted display. In the figure, reference numeral 1 denotes a human head, 2 an eye, and 3 an ear. A two-dimensional display 4, for example, a liquid crystal display, a back-light light source 5, and a projection optical system 6 are fixedly installed at each of the side and front of the head 1. Hereinafter, members which are installed at the side of the head 1 will be denoted by reference numerals with a suffix "s", while members which are installed in front of the user's face will be denoted by reference numerals with a suffix "f", for discriminating purposes. Light from a back-light light source 5s, which is installed at the side of the head 1, is formed into a parallel beam of light through a collimator lens 7s to illuminate a liquid crystal display 4s. The image of the liquid crystal display 4s is passed through a lens 8s and then through a lens 9s and reflected by a concave half-mirror 10. Then, the image is formed on a retina 11 in the eye 2. Meantime, the image of a liquid crystal display 4f is also passed through lenses 8f and 9f, transmitted by the concave half-mirror 10 and formed on the retina 11. Accordingly, the images of the two liquid crystal displays 4s and 4f are formed on the retina 11 in superimposition on one another. In the arrangement shown in the figure, the optical system that is installed at the side of the head 1 corresponds to the optical system for the image shown in the conceptual view at (b) of FIG. 1, while the optical system that is installed in front of the user's face corresponds to the optical system for the image shown in the conceptual view at (c) of FIG. 1. That is, the head-side optical system forms the image at a relatively large field angle, whereas the front optical system forms the image at a field angle smaller than the above. Therefore, a field stop 12 is installed in front of the concave half-mirror 10 to remove excess light in the front optical system.

The image signal is applied to the liquid crystal displays 4s, 4f from an image reproducing device 13, which is shown in FIG. 2(b), through cables 14. On the other hand, audio information is supplied through a voice cable 15 and provided as voice to the user by a speaker 16. Although in this embodiment the image and voice signals are transmitted by using electric cables, it should be noted that the present invention is not necessarily limited thereto and that these signals may be transmitted by air using an antenna.

Figure 3:
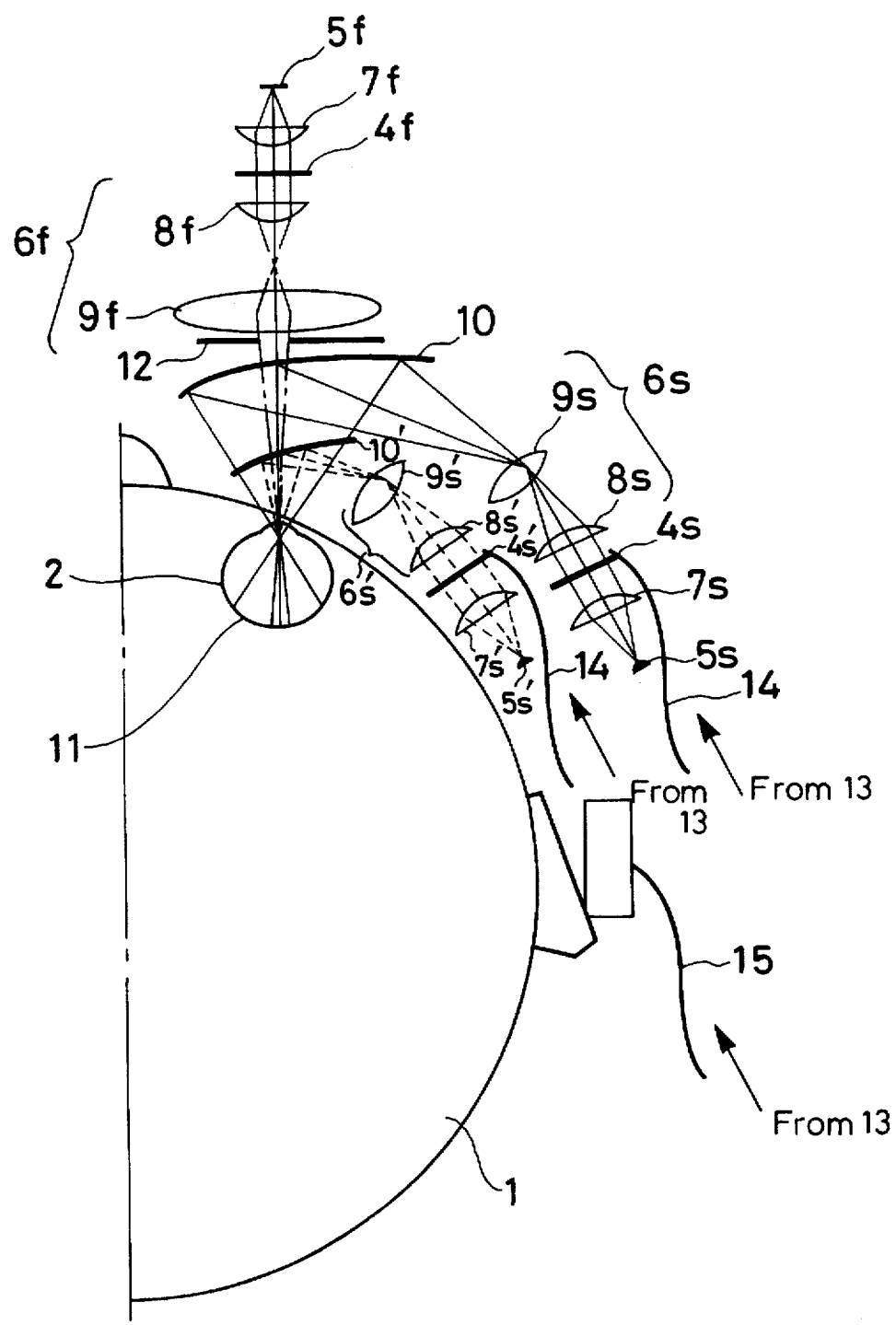
FIG. 3 is a view similar to FIGS. 2(a) and 2(b) showing a second embodiment of the present invention.

FIG. 3 shows an embodiment in which the present invention is applied to a head-mounted display and in which three two-dimensional image display elements are employed for each of the left- and right-hand sides. In this case, members of the third two-dimensional image display element, which is installed at the side of the head 1, are denoted by reference numerals with a suffix "s'". This embodiment is used in a case where one image frame contains two regions which are desired to be displayed at high resolutions, and where it is desired to display them at two different levels of high resolution. In the embodiment shown in FIG. 2, only the central region of the image frame is projected at a relatively low magnification by the optical system installed in front of the user's face. In the embodiment shown in FIG. 3, the image of the third liquid crystal display 4s' is formed around the central region of the image frame after being enlarged by the third optical system, which is denoted by reference numerals with a suffix "s'", so as to be smaller than the image formed by the first optical system s and larger than the image formed by the second optical system f, and the image composed of the three images is projected on the retina 11. It should be noted that the image passed through the third optical system is combined with the other two images by a second concave half-mirror 10' which is disposed on the side of the concave half-mirror 10 which is closer to the eye 2.

Figure 4:
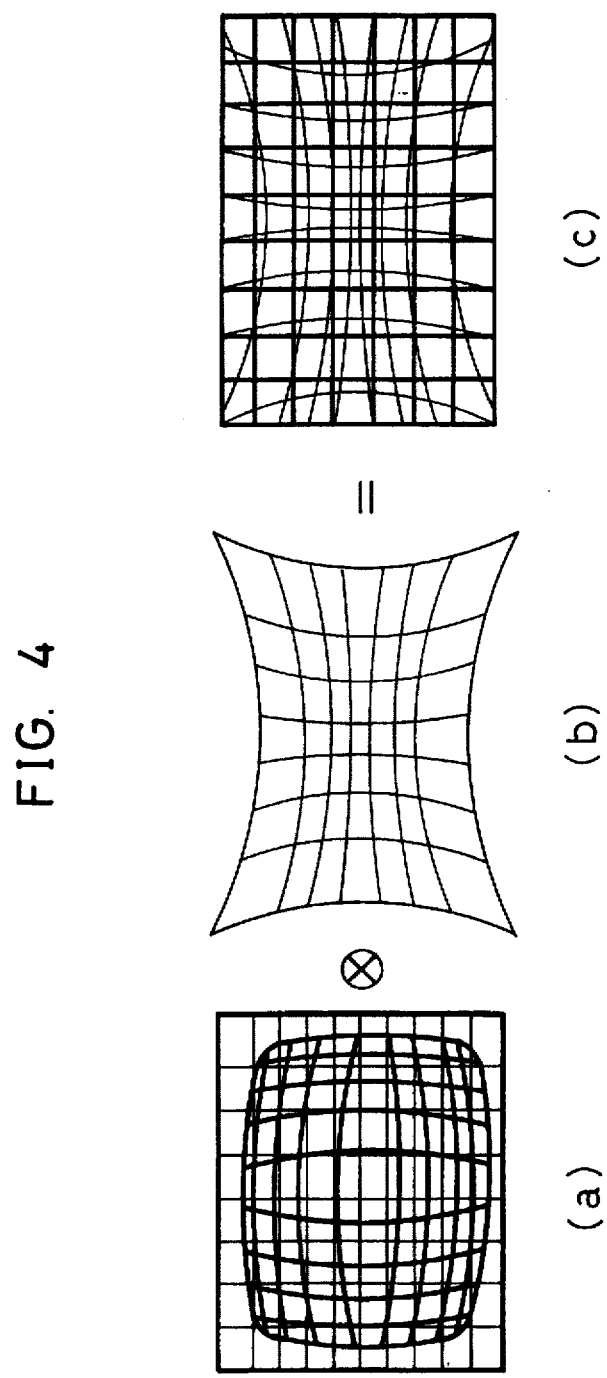
FIG. 4(a-c) shows the basic concept of another image display element employed in the present invention.

FIG. 4 shows the concept of another image display element of the present invention. First (a) in, FIG. 4 shows the condition of an image displayed on an array of pixels. The image that is displayed in the figure is distorted in a barrel-like shape by subjecting the grid-shaped original image to image processing. Next, the image, shown at (a) in FIG. 4, is enlarged by using a lens having pincushion distortion, as shown at (b) in FIG. 4. This distortion is approximately the same in size as but opposite in direction to the distortion of the image shown at (a) in FIG. 4. The image formed by enlarging the image shown at (a) in FIG. 4 through the lens is a grid-shaped, distortion-free image such as that shown at (c) in FIG. 4. It should be noted that the pixels are distorted in the form of a pincushion. That is, the central region of the image shown at (c) in FIG. 4 is represented by relatively fine pixels, whereas the peripheral region of the image is represented by relatively coarse pixels. Accordingly, the resolution of the central region of the image is raised. Thus, it is possible to raise the resolution of a desired region by using a distorted image and a lens having proper distortion.

Figure 5:
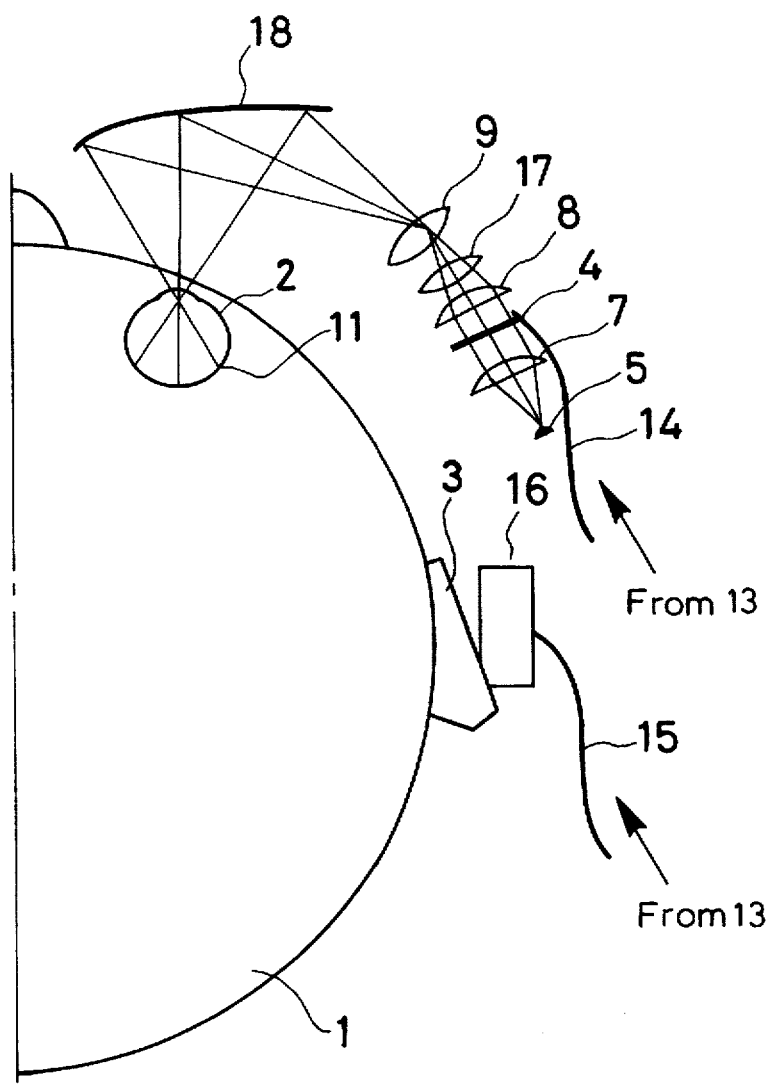
FIG. 5 shows the arrangement of a third embodiment in which the principle of the present invention shown in FIG. 4 is applied to a head-mounted display.

FIG. 5 shows the arrangement of a third embodiment in which the above-described principle is applied to a head-mounted display. In this embodiment, the optical system installed in front of the user's face in the first embodiment (i.e., the optical system denoted by reference numerals with a suffix "f") is not employed. Instead, an image that is distorted as shown at (a) in FIG. 4 is displayed on the liquid crystal display 4 in the optical system (the suffix "s" is omitted in FIG. 5) installed at the side of the head 1. The image of the liquid crystal display 4 is passed through the lens 8 and then corrected for the distortion by a lens 17 having distortion such as that shown at (b) in FIG. 4. Thereafter, the corrected image is formed on the retina 11 by the lens 9 and a concave mirror 18 (the concave half-mirror 10 may be used in place of it). It is also possible to generate similar distortion by the whole projection optical system (8, 17, 9 and 18) instead of the lens 17.

Figure 6:
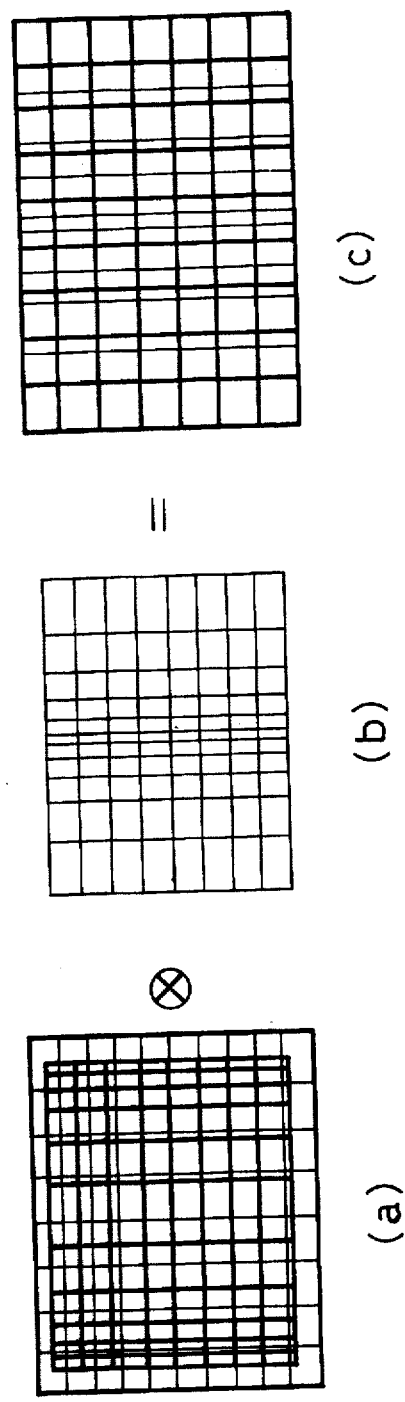
FIG. 6(a-c) is a conceptual view for explanation of an embodiment in which an image is subjected to expansion and contraction in the breadthwise direction.

Although in the foregoing embodiments the image is subjected to expansion and contraction in both the lengthwise and breadthwise directions of the image, it should be noted that the present invention is not necessarily limited thereto and that expansion and contraction may be effected in only one of the two directions. FIG. 6 shows an embodiment in which an image is subjected to expansion and contraction only in the breadthwise direction. FIG. 6 shows at (a) an image displayed on an array of pixels. In this case, the central region of the displayed image is enlarged breadthwise. This image is formed by an optical system having distortion in the breadthwise direction, as shown at (b) in FIG. 6. As a result, the distortion is removed from the image, and the central region of the image has a higher resolution than that of the other region, as shown at (c) in FIG. 6. Thus, the method in which the resolution is raised in only one direction has an advantage in that the electrical image processing is easy in comparison to the foregoing embodiments.

Incidentally, to obtain substantial effectiveness of improving resolving power in a display apparatus employing a lens provided with distortion as in the embodiments shown in FIGS. 4 to 6, it is preferable that local projection magnifications of the lens produced by the distortion satisfy the following expression:

$$\beta_1/\beta_2 \geq 1.2$$

where $\beta_1$ and $\beta_2$ respectively represent the maximum and minimum values of local projection magnifications.

In the above expression, if the magnification ratio $\beta_1/\beta_2$ is 1.2 or more, the size ratio of pixels projected is $1.2^2 \approx 1.4$ or more. It is apparent that the smaller the size of the pixels projected, the higher the resolution. Let us take the number of CCD pixels by way of example to express the effectiveness of the pixel area ratio, that is, 1.4. The above-described ratio, i.e., 1.4, is equivalent to the difference between a CCD having 300,000 pixels and a CCD having 450,000 pixels, which are generally different from each other in resolution by 1 grade. In other words, if there is locally a 1.2-fold difference between the maximum and minimum values of magnifications, a large difference can be produced in the resolution sensed by man.

Assuming pincushion distortion in which the magnification changes quadratic-functionally, if the marginal magnification is 1.2 with respect to the central magnification of 1, distortion of 40% is generated where the image height is 1. It is considered that optical systems having such extraordinarily large distortion are only those which are designed to generate such distortion intentionally. Accordingly, the optical system having a magnification ratio of 1.2 or higher does not include a lens in which distortion is unintentionally generated.

Figure 7:
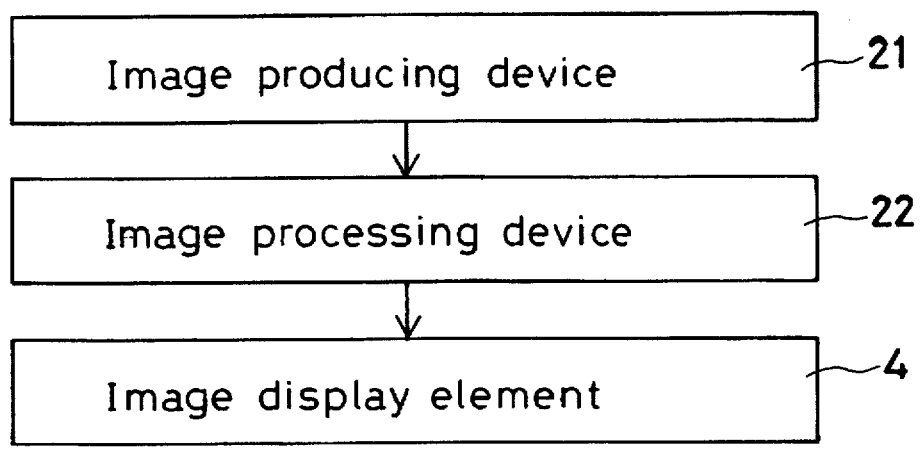
FIG. 7 is a block diagram for explanation of signal processing executed in a case where a distorted image is displayed.

Incidentally, when a distorted image is to be displayed on a liquid crystal display 4, e.g., a liquid crystal display as in the embodiments shown in FIGS. 4 to 6, a TV signal or a computer graphics image signal from an image producing device 21 or a video signal from a video reproducing device is subjected to processing for adding distortion thereto by an image processing device 22. As shown in FIG. 7, the signal with added distortion is then displayed as a distorted image on the screen of the image display element 4.

Figure 8:
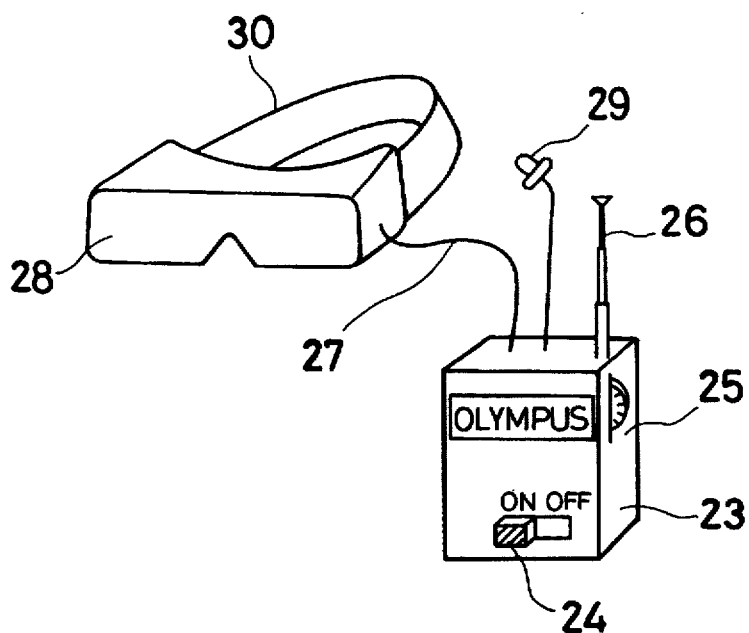
FIG. 8 is a perspective view showing the general arrangement of an apparatus that employs a TV signal receiving device.

FIG. 8 shows one example of the arrangement for the above-described system. When a switch 24 of a TV signal receiving device 23 is turned on, a TV signal of the channel that has been preset by actuating a TV channel selecting knob 25 is received by an antenna 26. The device 23 has a built-in image processing circuit (not shown), which adds distortion to the image signal received by the antenna 26 by the above-described processing, thereby forming a distorted image.

The distorted image is reproduced on the screen of an image display element 4, for example, a liquid crystal display, a small-sized CRT display, etc., provided in a goggle-type display apparatus body 28 through a cord 27. The image is corrected for the distortion by, for example, the lens 17 having distortion in the optical arrangement shown in FIG. 5. Thus, it is possible to raise the resolution of the central region in the displayed image.

In addition, the device 23 is provided with an earphone 29 to enable the user to listen to the TV sound.

Figure 9:
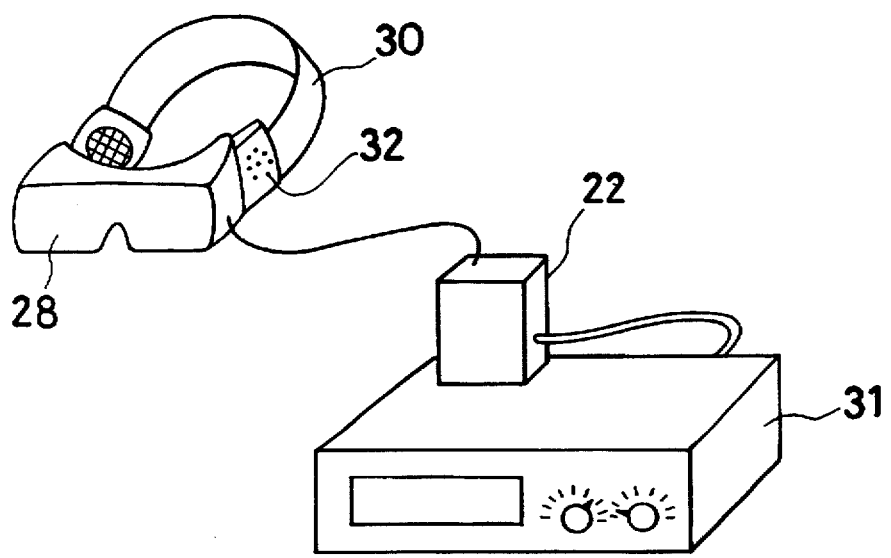
FIG. 9 is a perspective view showing the general arrangement of an apparatus that employs a video reproducing device.

It should be noted that the image producing device in the present invention is not necessarily limited to the above-described TV signal receiving device 23. One example of the image producing device is shown in FIG. 9. In the arrangement shown in FIG. 9, the image processing device 22 is connected to an existing video reproducing device 31 to add distortion to the video reproduced image and to transmit the distorted image to the image display element in the display apparatus body 28. In this case, no earphone is provided as a separate member, but a headphone 32 is attached to a rubber band provided as a support member 30 for the display apparatus body 28 instead.

Figure 10:
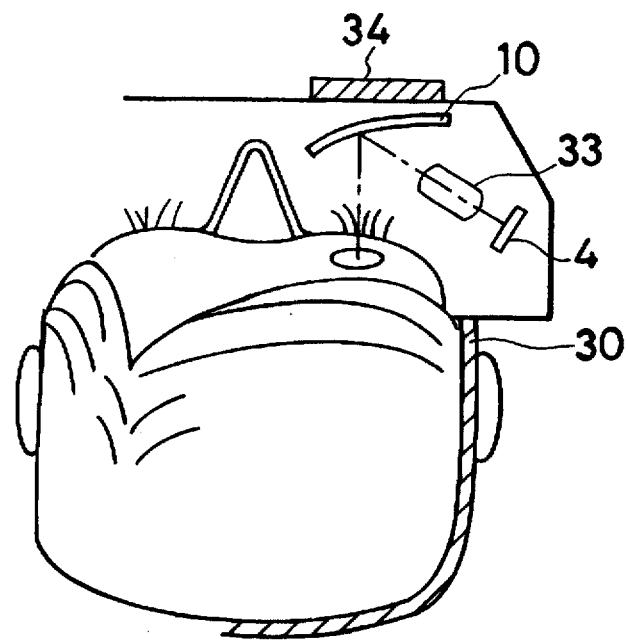
FIG. 10 shows one example of the optical arrangement of a head-mounted display having see-through function.
Figure 11:
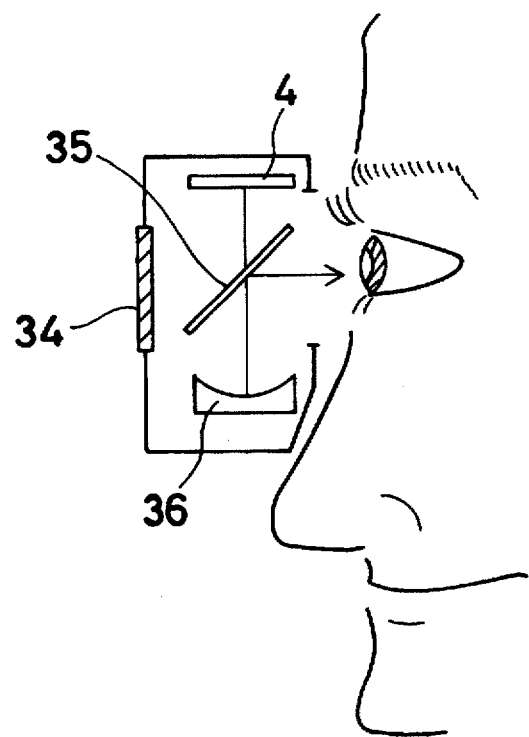
FIG. 11 shows another example of the optical arrangement of a head-mounted display having see-through function.

It should be noted that the TV signal receiving device 23 and the display apparatus body 28, shown in FIG. 8, may be provided as one integrated unit. Further, the processing operation conducted by the image processing device 22 is not necessarily limited to the electrical processing but may be optical processing. Incidentally, the optical arrangement of the head-mounted display is not necessarily limited to that shown in FIG. 5. The idea of the present invention can be applied to various optical arrangements. FIGS. 10 and 11 exemplarily show two different optical arrangements.

FIG. 10 shows an optical arrangement which is similar to that shown in FIG. 5. In the arrangement shown in FIG. 10, however, a concave half-mirror 10 is employed in place of the concave mirror 18, and a shutter 34 is additionally disposed in front of the concave half-mirror 10 to provide a see-through function. With this see-through function, when the shutter 34 is open, a real world image, for example, an outside scene, is transmitted by the concave half-mirror 10 and observed in combination with an image displayed on an image display element 4 or alone with the displayed image turned off. In this case also, a distorted image is displayed on the image display element 4, and a relay optical system 33 is provided with distortion for correcting the distortion of the displayed image. Thus, it is possible to raise the resolution of the central region in the displayed image in the same way as described above.

In the arrangement shown in FIG. 11, a half-mirror 35 is disposed in front of the observer's eye at an angle to his/her line of sight, and an image display element 4 and a concave mirror 36 are disposed to face each other across the half-mirror 35 and extend parallel to the observer's line of sight. In addition, a shutter 34 is disposed forwardly of the half-mirror 35 in the observer's line of sight. Thus, an image displayed on the screen of the image display element 4 is transmitted by the half-mirror 35, enlarged by the concave mirror 36 and reflected by the half-mirror 35 so as to be projected on the retina in the observer's eyeball as an enlarged image. Meantime, when the shutter 34 is open, an outside world image can be observed through the half-mirror 35 in combination with the image displayed on the image display element 4 or alone with the displayed image turned off in the same way as in the case of FIG. 9. In this case also, a distorted image is displayed on the screen of the image display element 4, and an optical system disposed at a position intermediate between the image display element 4 and the observer's eye, e.g., the concave mirror 36, is provided with distortion for correcting the distorted image. Thus, it is possible to raise the resolution of the central region in the displayed image in the same way as described above.

Figure 12:
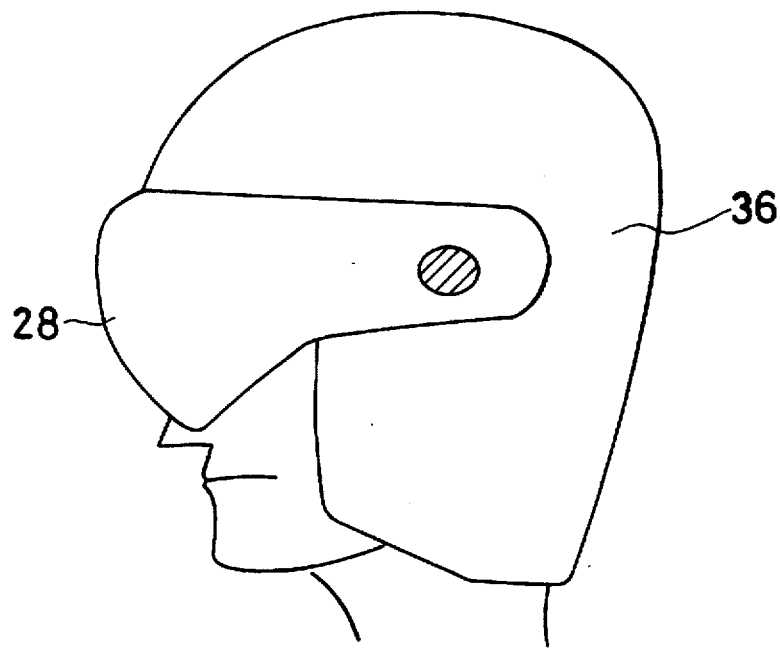
FIG. 12(a-b) shows the way of supporting a head-mounted display.
Figure 12:
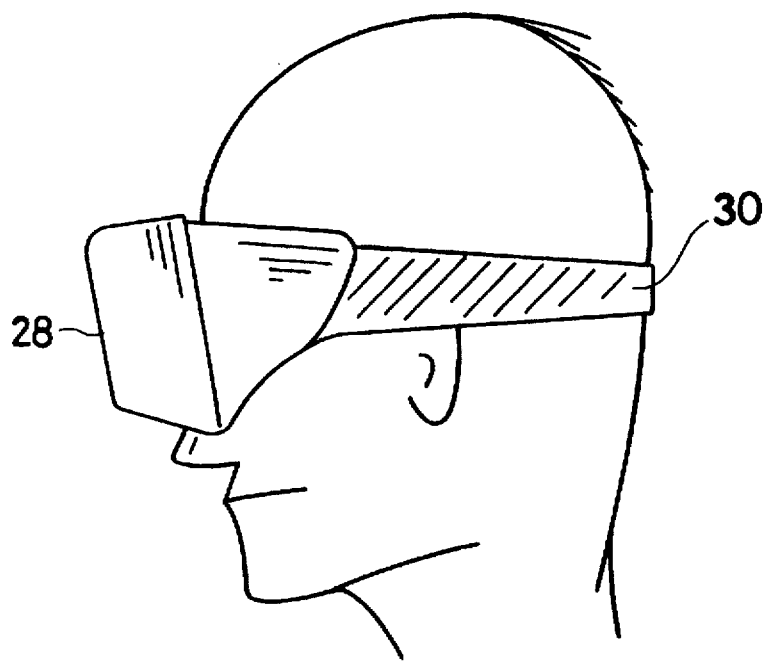

The display apparatus body 28 of the head-mounted display, to which the present invention can be applied, may be supported on the user's head in various forms, for example, a helmet type in which the display apparatus body 28 is attached to a helmet 36, as shown in FIG. 12(a), and a goggle type in which the display apparatus body 28 is supported by a rubber band 30, as shown in FIG. 12(b).

Although in the foregoing embodiments the resolution of the central region of the displayed image is raised, it should be noted that the present invention is not necessarily limited thereto and that the resolution of any region of the displayed image can be raised. Further, although in the foregoing embodiments the image display element is illuminated by a light source to display an image, an image display element that emits light spontaneously, such as a gas-plasma display, may also be employed.

Incidentally, the structure of the present invention exhibits remarkable effectiveness in a head-mounted display because it is preferable in a head-mounted display that the central region of a projected image have high resolution from the viewpoint of the structure of the eye, and that the image display element be compact in size because it is mounted on the user's head. Therefore, embodiments in which the present invention is applied to a head-mounted display have been shown in the foregoing description. However, the present invention also provides similar advantageous effects in application to other types of display apparatus, as a matter of course.

Although the display apparatus of the present invention has been described above by way of some embodiments, it should be noted here that the present invention is not necessarily limited to the described embodiments and that various changes and modifications may be imparted thereto.

As will be clear from the foregoing description, the visual display apparatus of the present invention makes it possible to raise the resolution of a desired region in a displayed image without particularly increasing the size of the image display element.

What we claim is:

1. A display apparatus comprising:

image producing means for providing an image by at least one of generating and receiving said image;

electrical image processing means for electrically effectuating a first distortion of said image provided by said image producing means;

an image display element for forming on a screen said image with said first distortion effectuated by said electrical image processing means;

an ocular optical system including an optical element for effectuating a second distortion of said image to correct said electrically effectuated first distortion of said image, said ocular optical system having an optical path leading said image to said observer's eyeball; and a support member for fitting at least said image display element and said ocular optical system to at least one of a head and a face of said observer, wherein said first distortion is barrel distortion; and said second distortion is pincushion distortion.

2. A display apparatus according to claim 1, wherein:

said second distortion effectuated by said ocular optical system is such that a peripheral region of said image projected toward said observer's eyeball is magnified to a greater extent than a central region of said image projected toward said observer's eyeball.

3. A display apparatus according to claim 1, wherein said image display element satisfies the following condition in order to improve resolution as seen by an observer's eyeball:

$$\beta_1/\beta_2 \geq 1.2$$

where $\beta_1$ and $\beta_2$ respectively represent maximum and minimum values of a local projection magnification.

4. A display apparatus according to claim 3, wherein:

said second distortion effectuated by said ocular optical system is such that a peripheral region of said image projected toward said observer's eyeball is magnified to a greater extent than a central region of said image projected toward said observer's eyeball.

5. A display apparatus according to claim 1, wherein said image producing means provides a digital image.

6. A display apparatus according to claim 1, wherein said image producing means provides an analog image.

7. A display apparatus according to claim 1, wherein said first distortion is predetermined in relation to said second distortion such that said second distortion substantially cancels said first distortion.

8. A display apparatus comprising:

an image producing means for providing an image by at least one of generating and receiving said image;

an image display element for forming said image on a flat screen, said screen of said image display element being formed by two-dimensionally arranged pixels;

an electrical image processing means for electrically effectuating a first distortion of barrel shape to image information sent from said image producing means before said image information is formed as said image on said screen of said image display element;

an ocular optical system arranged to form an optical path for leading said image formed on said flat screen to an observer's eyeball, said ocular optical system having an optical element designed to produce a second distortion of pincushion shape to correct said barrel distortion electrically effectuated to said image; and a support member for fitting at least said image display element and said ocular optical system to at least one of a head and a face of said observers.

9. A display apparatus according to claim 8, wherein said second distortion effectuated by said ocular optical system is such that a peripheral region of said image projected toward said observer's eyeball is magnified to a greater extent than a central region of said image projected toward said observer's eyeball.

10. A display apparatus according to claim 8, wherein said image display element satisfies the following condition in order to improve resolution as seen by an observer's eyeball:

$$\beta_2/\beta_2 \geq 1.2$$

where $\beta_1$ and $\beta_2$ respectively represent maximum and minimum values of a local projection magnification.

11. A display apparatus according to claim 10, wherein:

said second distortion effectuated by said ocular optical system is such that a peripheral region of said image projected toward said observer's eyeball is magnified to a greater extent than a central region of said image projected toward said observer's eyeball.

12. A display apparatus according to claim 8, wherein said image producing means provides a digital image.

13. A display apparatus according to claim 8, wherein said image producing means provides an analog image.

14. A display apparatus according to claim 8, wherein said first distortion is predetermined in relation to said second distortion such that said second distortion substantially cancels said first distortion.

* * * * *